United States Patent [19]

Brown

[11] Patent Number: 4,870,553
[45] Date of Patent: Sep. 26, 1989

[54] DOUBLE-SWITCHED FLYBACK POWER-CONVERTER

[75] Inventor: Alan E. Brown, Houston, Tex.

[73] Assignee: Compaq Computer Corporation, Houston, Tex.

[21] Appl. No.: 267,456

[22] Filed: Nov. 4, 1988

[51] Int. Cl.$^4$ ............................................. H02M 3/335
[52] U.S. Cl. ........................................ 363/16; 363/80; 363/97; 323/289
[58] Field of Search ............... 363/16, 17, 18–21, 363/22–26, 78–80, 97, 98, 131–134, 49; 323/289

[56] References Cited

U.S. PATENT DOCUMENTS

| | | | |
|---|---|---|---|
| 4,092,709 | 5/1978 | Voigt et al. | 363/18 |
| 4,302,802 | 11/1981 | Hyde et al. | 363/21 |
| 4,408,267 | 10/1983 | Pruitt | 363/17 |
| 4,594,649 | 6/1986 | Rhoads et al. | 363/21 |
| 4,608,625 | 8/1986 | Josephson et al. | 363/21 |
| 4,686,616 | 8/1987 | Williamson | 363/21 |
| 4,763,238 | 8/1988 | Maige | 363/21 |

Primary Examiner—Peter S. Wong
Attorney, Agent, or Firm—Arnold, White & Durkee

[57] ABSTRACT

A double-switched flyback power-converter has a primary winding of a power transformer connected between the output terminals of a high voltage DC power supply. A first switch is connected between the positive terminal of the power supply and a first end of the primary winding. A second switch is connected between the negative terminal of the power supply and a second end of the primary winding. During a primary conduction cycle, a current monitor senses the primary winding current and signals a control logic circuit at a predetermined current level. The control logic circuit turns off the second switch, forcing the power transformer into a flyback cycle. During the flyback cycle, energy stored in the primary winding of the power transformer is coupled over to the secondary windings. A major portion of the energy goes to a power output circuit, where it is rectified and filtered for output power use. The remainder of the energy is transferred to a charge pumping circuit at each switch. When the stored energy formed by the primary winding is depleted, the charge pumping circuits pump charge into the switches. The switches turn on, returning the double-switched flyback power converter to the primary conduction cycle.

7 Claims, 4 Drawing Sheets

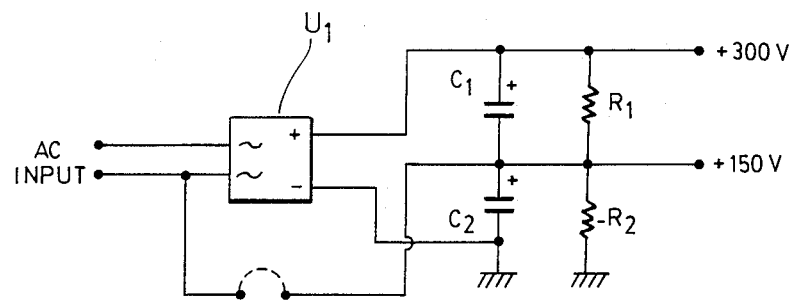
Fig.4
Fig.5
(PRIOR ART)
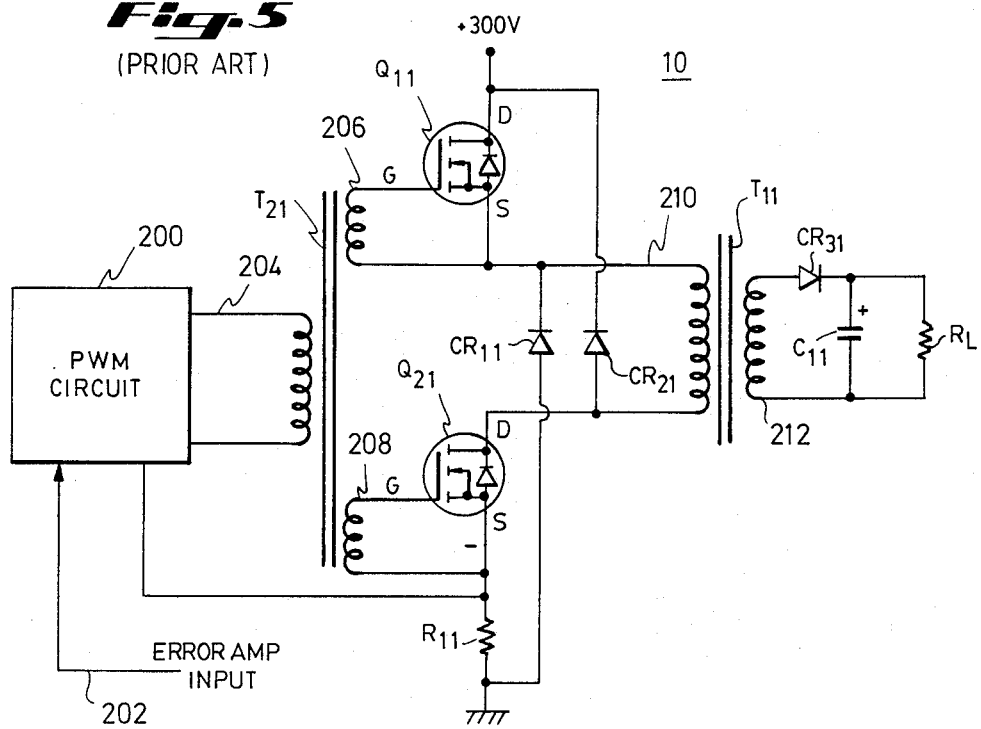

DOUBLE-SWITCHED FLYBACK POWER-CONVERTER

BACKGROUND OF THE INVENTION

1. Field of the Invention

This invention relates generally to power converters and, more particularly, to double-switched flyback converters.

2. Related Art

Modern electronic systems require power regulation to condition the output of the primary power source. Power converters provide a regulated DC voltage from a primary DC source. Conventional DC/DC converters are generally of the push-pull or switching regulator type.

A flyback converter uses a switching regulator to cyclically store and transfer energy from a primary DC source through a power transformer to an output circuit. The primary winding of the power transformer is connected to the primary DC source; the secondary winding is connected to the output circuit. The switching regulator alternately opens and closes a switch connecting the primary DC source to the primary winding of the transformer. This switching action defines a power cycle which inductively couples the primary DC source to the output circuit.

The power cycle of the converter comprises two parts: a primary conduction cycle and a flyback cycle. During the primary conduction cycle, the switch is closed, transferring energy from the primary DC source to the primary winding of the power transformer. At a preset power level in the primary winding, the switch is opened, starting the flyback cycle. During this cycle, energy is coupled through the secondary winding into a rectified output circuit.

The amount of energy stored per cycle is controlled by regulating the switching action. Generally speaking, a pulse width modulating (PWM) circuit regulates the switching action by varying the pulse width or "on" time of the switches. Negative feedback of the output voltage is frequently used in conjunction with the PWM circuit to provide output voltage regulation.

A double-switched flyback converter uses two switches in series and on opposite ends of the primary winding of the transformer. The switches, typically, are high voltage transistors driven by a gate drive transformer connected directly to the PWM circuit. The PWM circuit, acting through the gate drive transformer, biases the gates of the transistor switches to the "on" state, storing energy in the primary winding during the primary conduction cycle. The gates of the transistor switches are subsequently biased to the "off" state during the flyback cycle.

In known converters, transients in the primary DC source or output load may impose undesirable stresses in the converter circuit. For instance, a surge in the input voltage may transfer excess energy to the primary winding during the primary conduction cycle; during the subsequent flyback cycle, the PWM circuit may command the transistor switches "on" before the energy transfer to the secondary winding is complete. This condition imposes high stress currents on both the transistor switches and the power transformer, leading to possible component failure. This condition occurs because the PWM circuit is blind to the exact status of the energy transfer at the power transformer. Therefore, it is desirable to monitor the status of the energy transfer at the transformer windings to provide for more efficient switching action.

SUMMARY OF THE INVENTION

The invention overcomes the above-noted and other drawbacks of the prior art by providing a method and apparatus using a double-switched flyback power-converter that features the capability of monitoring the exact status of the energy transfer at the power transformer windings. This capability allows for more efficient switching in the power cycle and obviates the need for the PWM circuit to control the switching action.

The double-switched flyback power-converter has a transformer primary winding connected between the output terminals of a high voltage DC power supply. A first switch is connected between the positive terminal of the power supply and a first end of the primary winding. A second switch is connected between the negative terminal of the power supply and a second end of the primary winding. A power output circuit is connected to one of three secondary windings; a charge pumping circuit is connected to each of the other two secondary windings.

During the primary conduction cycle, a current sensing means monitors the primary winding current and signals a control logic circuit at a predetermined current level. The control logic circuit then turns off the second switch, forcing the power transformer into the flyback mode of operation.

During the flyback cycle, energy stored in the primary winding of the power transformer is coupled to the secondary windings. A major portion of the energy is transferred to the power output circuit where it is rectified and filtered for output use. The remainder of the energy is transferred to the charge pumping circuit at each switch.

When the stored energy in the primary winding is depleted, the charge pumping circuit pumps the charge stored from the flyback cycle into the switches. The switches turn on, returning the double-switched flyback power converter to the primary conduction cycle. The total power cycle is now complete and ready to repeat.

BRIEF DESCRIPTION OF THE DRAWINGS

The above-noted and other aspects of the present invention will become more apparent from a description of the preferred embodiment when read in conjunction with the accompanying drawings.

The drawings illustrate the preferred embodiment of the invention, wherein like members bear like reference numerals and wherein:

FIG. 4 illustrates an alternative rectifier and filter circuit enabling the double-switched flyback power converter to operate from different line voltages.

FIG. 5 depicts a known, double-switched flyback power-converter.

DETAILED DESCRIPTION OF THE PREFERRED EMBODIMENT

Figure 1:
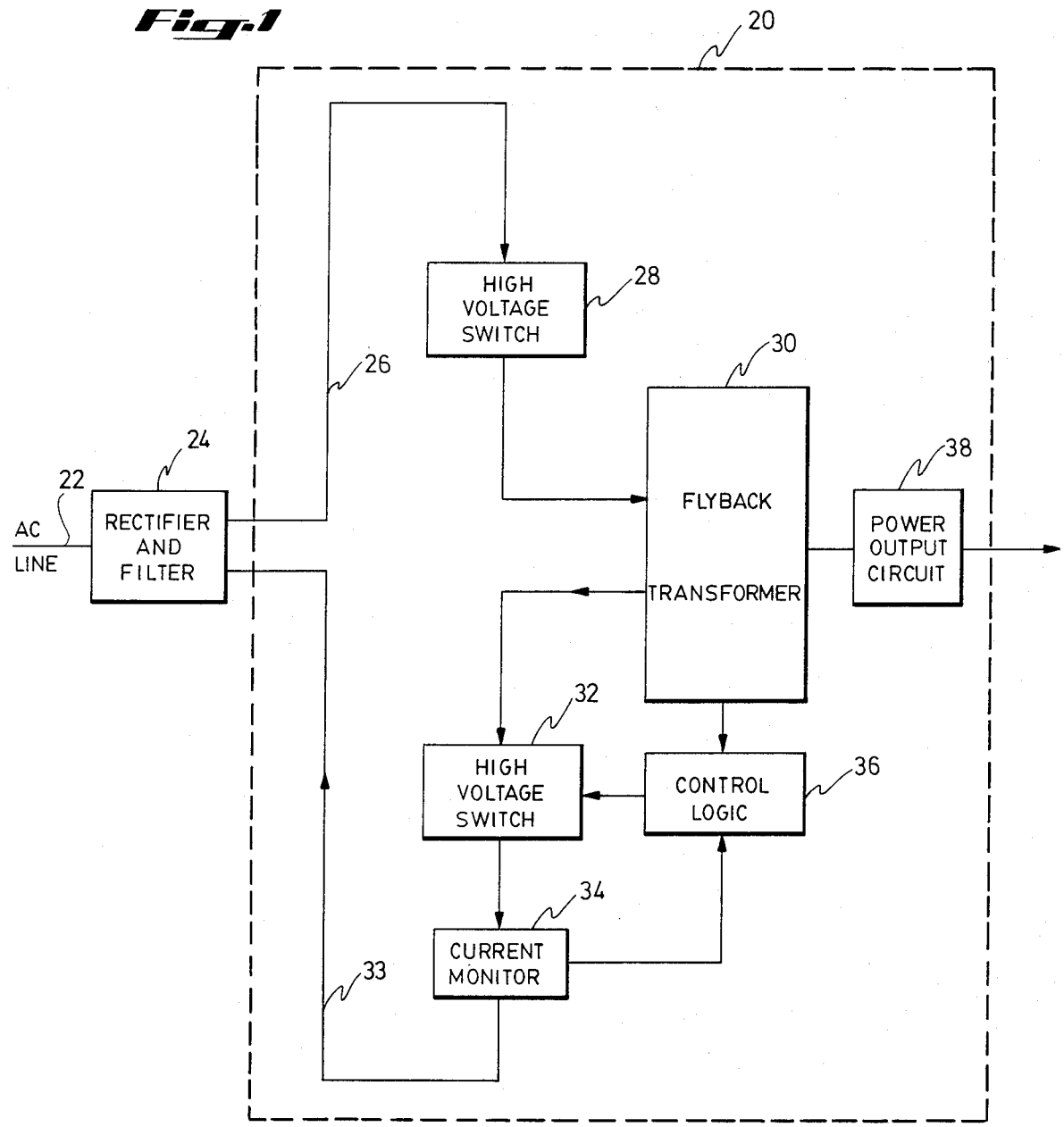
FIG. 1 illustrates a double-switched flyback power-converter in a block diagram form.

FIG. 5 depicts a known flyback power-regulator 10. A PWM circuit 200 provides duty cycle switching to a gate-drive transformer T21. An error amp input feedback line 202 indicates to the PWM circuit variation of the voltage out of the power-regulator 10 from a reference (not shown). Current through a primary winding 204 of the gate-drive transformer T21 creates a flux that is coupled to a pair of secondary windings 206 and 208. Flux reversal at the secondary windings 206 and 208 drives the gates of a pair of switches represented by transistors Q11 and Q21. When transistors Q11 and Q21 conduct, flux builds up in a primary winding 210 of a transformer T11. A subsequent pulse to the gate-drive transformer T21 opens the switches Q11 and Q21 to initiate the flyback cycle at the transformer T11. A diode CR31 rectifies the voltage developed at the secondary 212 of the transformer T11, which voltage is filtered by capacitor C11. A resistor RL represents the load. A current sense resistor R11 provides a signal to the PWM circuit indicative of the primary current at transformer T11. Line 202 and R11 indicate to the PWM 200 when to end a primary conduction cycle and allow stored energy to be transferred to the secondary winding 212.

FIG. 1 depicts a double-switched flyback power-converter 20 in block diagram form. A 110 VAC line 22 provides input power to a rectifier and filter circuit 24. The rectifier and filter circuit 24 provides a high voltage DC supply to the double-switched flyback power-converter 20.

A conductor 26 connects the positive side of the high voltage DC supply to one side of a first high-voltage switch 28. A second high-voltage switch 32 connects to the negative side of the high voltage DC supply through a conductor 33. The primary winding of a power transformer 30 connects in series between the first high voltage switch 28 and the second high voltage switch 32.

During the primary conduction cycle, the power transformer 30 receives current through the high-voltage switches 28 and 32. A current monitor 34 measures the current passing through the high voltage switches 32 and 28 and the primary winding of the transformer 30. The current monitor converts the current to a voltage level and sends the voltage level to the control logic circuit 36. The control logic circuit 36 ends the primary conduction cycle by turning off the second high voltage switch 32, beginning a flyback or a power conversion cycle. Energy stored in the power transformer 30 during the primary conduction cycle is depleted during the flyback cycle by current generated in the secondary windings of the power transformer 30. A power output rectifier and filter circuit 38 connected to one of the secondary windings rectifies and filters a major portion of the secondary current.

Upon transformer flux depletion during the flyback conversion cycle, current stops flowing in the secondary windings. Flux depletion allows the double-switched flyback power converter to begin the primary conduction cycle. This characteristic overcomes the dangers of making connection to a charged inductive circuit with the corresponding risk to semiconductor components.

Figure 2:
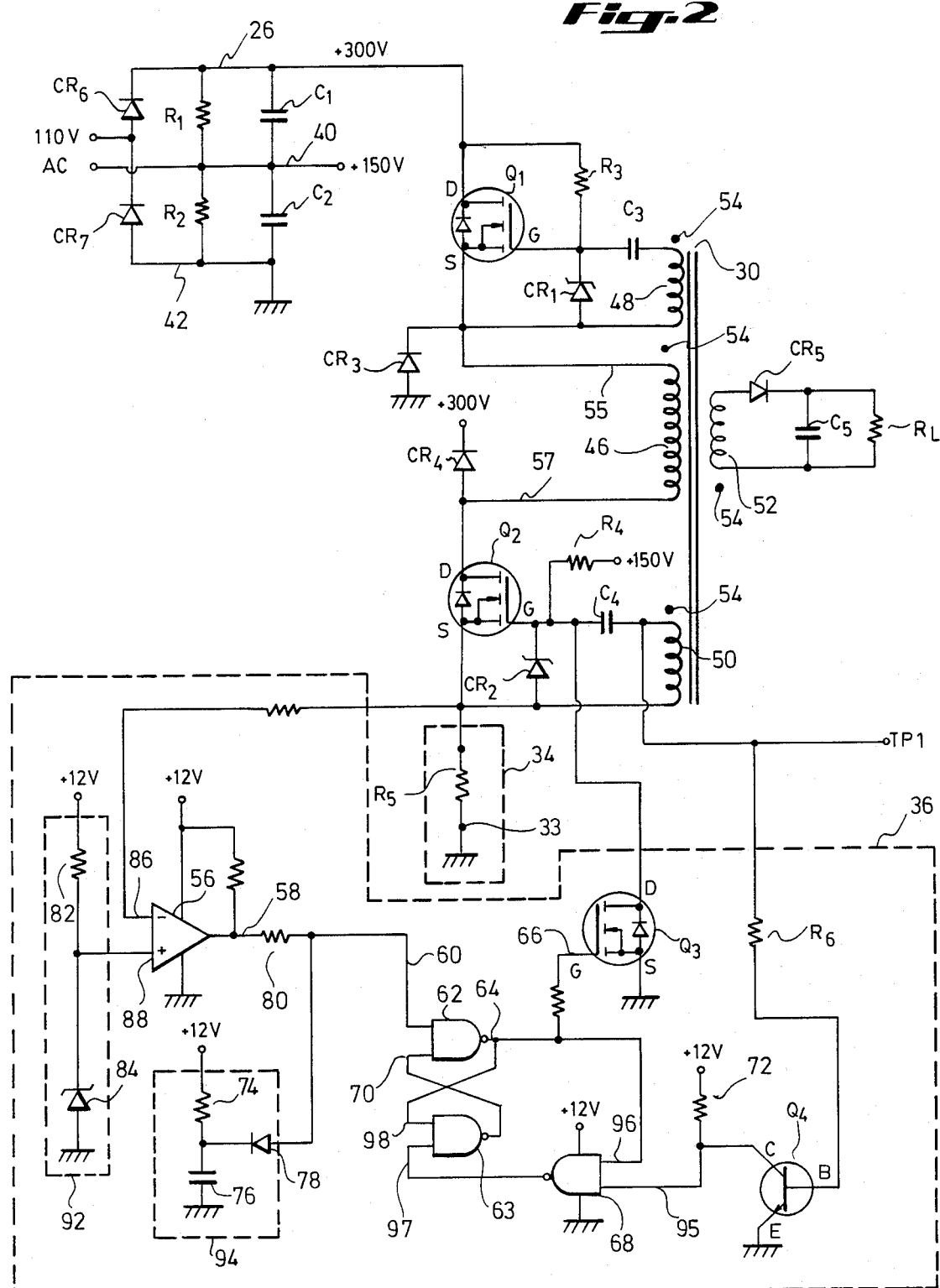
FIG. 2 illustrates a circuit diagram of the double-switched flyback power-converter used in the preferred embodiment of the disclosed invention.

FIG. 2 provides a more detailed depiction of the double-switched flyback power-converter 20. A pair of diodes, CR6 and CR7, rectify the 110 VAC line voltage. Current flows through rectifier diode CR6 during the positive half of the input cycle, charging a smoothing capacitor C1 to approximately 150 V. Current flows through rectifier diode CR7 during the negative half of the input cycle, charging a smoothing capacitor C2 to approximately 150 V. The negative side of capacitor C2 is grounded; the positive side of the capacitor C2 connects to a conductor 40 and remains at approximately 150 V. The negative side of the capacitor C1 connects to the conductor 40; the positive side of capacitor C1 connects to conductor 26 and is approximately 300 V above ground. Resistors R1 and R2 bleed current from capacitors C1 and C2 respectively.

The power transformer 30 includes a primary winding 46, a first secondary winding 48, a second secondary winding 50, and a third secondary winding 52. A dot 54 at one end of each winding shows the polarization of the windings. For consistency, the end of a winding having a dot will be referred to as the first end of the winding, and the opposite end of the winding will be referred to as the second end of the winding. A first end 55 of the primary winding 46 is connected to the 300 V supply via an enhancement mode MOSFET transistor Q1. A second end 57 of the primary winding 46 is connected to ground via a second enhancement mode MOSFET transistor Q2 and a resistor R5. Transistors Q1 and Q2 are the high voltage switches 28 and 32, respectively, of FIG. 1.

A first end of the first secondary winding 48 connects to a capacitor C3. A second end of the first secondary winding connects to the source S of transistor Q1. Current from the 300 VDC supply flows through a resistor R3 to initially charge the gate of transistor Q1. Thereafter, the gate of Q1 is controlled by a circuit comprising the first secondary winding 48, the capacitor C3 and a zener diode CR1.

A first end of the second secondary winding 50 connects to a capacitor C4. A second end of the second secondary winding connects to the source S of transistor Q2. Current from the 150 VDC supply flows through a resistor R4 to initially charge the gate of transistor Q2. Thereafter, the gate of Q2 is controlled by the circuit comprising the second secondary winding 50, the capacitor C4 and a zener diode CR2.

The third secondary transformer winding 52 drives current through the output circuit 38 during the flyback cycle of the double-switched flyback power-converter 20. A diode CR5 rectifies the output current which is then filtered by a capacitor C5. A resistor $R_L$ represents a load connected to the power output circuit.

A resistor R5 is connected between the source of transistor Q2 and ground. The resistor R5 serves as the current monitor 34 of FIG. 1, generating a voltage proportional to the current flowing through the primary winding 46 of the power transformer 30.

During the primary conduction cycle, transistors Q1 and Q2 are turned on. Initially, the gates of transistors Q1 and Q2 are charged in a positive direction through resistors R3 and R4 respectively. As Q1 and Q2 begin to turn on, current flowing through the transformer primary winding 46 induces voltage onto the secondary windings 48, 50, and 52. Capacitors C3 and C4 transfer this induced voltage to the gates of transistors Q1 and Q2 respectively. This increases the positive charge on the gates and rapidly turns the transistors Q1 and Q2 into full conduction.

The zener diodes CR1 and CR2 limit the gate to source voltage of the transistors Q1 and Q2 to approximately 15 V, providing over-voltage protection between the gate and source of each transistor.

As the current increases through the primary winding 46, a voltage representative of the current is developed across the resistor R5. Control logic circuit 36 monitors this voltage. At a predetermined voltage level, control logic circuit 36 turns on a MOSFET transistor Q3 which discharges the gate of transistor Q2 to ground. Transistor Q2 turns off, breaking the current path through the transformer primary winding 46. A flux reversal occurs, inducing a voltage of opposite polarity across the windings of the power transformer 30. Capacitors C3 and C4 couple this voltage reversal to the gates of the transistors Q1 and Q2 respectively. The gates of transistors Q1 and Q2 rapidly discharge to one diode threshold voltage drop below their respective sources, turning off transistor Q1 and ensuring transistor Q2 remains off. Zener diode CR1, being forward biased, maintains a diode threshold drop across the gate of transistor Q1. Zener diode CR2, being forward biased, maintains a diode threshold volt drop across the gate of transistor Q2. Clamping diodes CR3 and CR4 protect the transistors Q1 and Q2 respectively from voltage overshoot which may occur when the primary current in the power transformer 30 is interrupted.

Turning off transistors Q1 and Q2 forces the double-switched flyback power converter 20 into the flyback cycle.

During the flyback cycle, most of the energy stored during the primary conduction cycle is transferred to the power output circuit 38. The energy stored in the power transformer 30 is a function of the level of the primary current at the end of the primary conduction cycle; this current is then absorbed during the flyback cycle by current induced in the secondary windings 48, 50, and 52. The major portion of this current is induced into the third secondary winding 52, charging the capacitor C5 through the forward biased diode CR5. The remainder of this secondary current is induced into the first and second secondary windings 48 and 50. The first secondary winding 48 charges the capacitor C3 through the forward biased diode CR1; the second secondary winding 50 charges the capacitor C4 through the forward biased diode CR2.

The secondary currents fall as a function of time and of the mutual inductance of the transformer windings. As the secondary current reaches zero, the flux reverses direction. With this flux change, a voltage reversal occurs across all of the transformer windings. Capacitors C3 and C4, having charged up during the flyback cycle, pump charge into the gates of transistors Q1 and Q2 respectively. The transistors Q1 and Q2 turn on, forcing current to build up in the primary winding 46. The primary cycle then proceeds under the control of the control logic circuit 36. The total power cycle is now ready to repeat.

The control logic circuit 36 comprises NAND gates 62, 63, and 68, a voltage reference circuit 92, a voltage comparator 56, the enhancement mode MOSFET transistor Q3, a voltage sensing bipolar transistor Q4, and a start-up circuit 94.

The control logic circuit receives a regulated DC supply of, for example, +12 V from the 110 VAC line.

The start-up circuit 94 has the first end of a resistor 74 connecting to the +12 V supply. The second end of the resistor 74 connects to the first end of a capacitor 76 and the cathode of a diode 78. The second end of the capacitor 76 connects to ground. At the time of initial power-up of the double-switched flyback power-converter 20, the capacitor 76 holds the cathode of the diode 78 to near ground potential. The anode of the diode 78 holds an input 60 of the NAND gate 62 one diode threshold voltage drop above ground, which is at a logical zero. An output 64 of the NAND gate 62 is thus forced to a logical one, charging the gate of the transistor Q3 and turning the transistor Q3 on. By discharging the gate of Q2, transistor Q3 holds off transistor Q2, preventing current from passing through the primary winding 46 of the power transformer 30.

The start-up circuit 94 allows the control logic circuit 36 to stabilize before the double-switched flyback power converter 20 begins to function. After a time period determined by the time constant of resistor 74 and capacitor 76, capacitor 76 charges towards the +12 V supply, enabling the input 60 of the NAND gate 62 to be controlled by the voltage comparator 56.

The first end of a resistor 82 connects to the +12 V supply. The second end of the resistor 82 connects to the cathode of a zener diode 84 and to the positive input of the comparator 56. The anode of the zener diode 84 connects to ground. Resistor 82 is selected to allow sufficient current to pass through the zener diode 84, providing a stable reference voltage at the positive input 88 of comparator 56. The zener voltage characteristic of the zener diode 84 determines the value of the reference voltage. Diodes with different zener values may be used to change the reference voltage.

During the primary conduction cycle, the voltage generated across the current monitor resistor R5 appears at the negative input 86 of the comparator 56. The positive input 88 of the comparator 56 has a reference voltage of, for example, 2.5 volts. When the monitored voltage across resistor R5 exceeds the comparator reference voltage, the output 58 of the comparator 56 changes to a logical zero. The logical zero is transmitted to the input 60 of the NAND gate 62. On receiving the logical zero at input 60, the output 64 of the NAND gate 62 goes to a logical one. The logical one at the output 64 of the NAND gate 62 positively charges the gate 66 of the enhancement mode MOSFET transistor Q3. Transistor Q3 turns on and discharges the gate of transistor Q2 towards ground, turning off the transistor Q2. This ends the primary conduction cycle.

The effect of transistor Q3 turning on, combined with the subsequent voltage reversal across the second secondary transformer winding 50, imposes a reverse bias across the base-emitter junction of transistor Q4. Transistor Q4 turns off, allowing a pull-up resistor 72 to raise the collector of Q4 to approximately +12 volts, establishing a logical one at the input 95 of NAND gate 68. The input 96 of NAND gate 68, being connected to the output of NAND gate 64, is a logical one. The output of NAND gate 68 is, therefore, a logical zero. The output of NAND gate 68 connects to the input 97 of NAND gate 63. The input of NAND gate 63 being a logical zero establishes a logical one at the output of NAND gate 63. The output of NAND gate 63 connects to the input 70 of NAND gate 62 and holds the input 70 at a logical one.

Turning off transistor Q2 reduces the voltage across the resistor R5 to zero. Hence, the negative input 86 of the comparator 56 falls below the reference voltage. The output 58 of the comparator 56 returns to a logical one level. This logical one level is transferred to the input 60 of the NAND gate 62. Since the input 70 of the NAND gate 62 has been set to a logical one, the output 64 of the NAND gate 62 goes to a logical zero. The gate of enhancement mode MOSFET transistor Q3 discharges, turning off the transistor Q3. The logical zero at the output 64 of NAND gate 62 is connected to the input 98 of NAND gate 63; the output of NAND gate 63 is forced to a logical one, establishing a logical one at the input 70 of NAND gate 62. The logic circuit made up of the NAND gates 63, 64, and 68, remains in a stable state until the voltage comparator 56 detects the peak current during the next primary conduction cycle.

At the start of the next primary conduction cycle, the voltage induced across the second secondary winding 50 drives current through the base of transistor Q4. Transistor Q4 turns on, establishing a logical zero at the input 95 of NAND gate 68, forcing the output of NAND gate 68 to a logical one. A resistor R6 limits the base current in transistor Q4.

Figure 3:
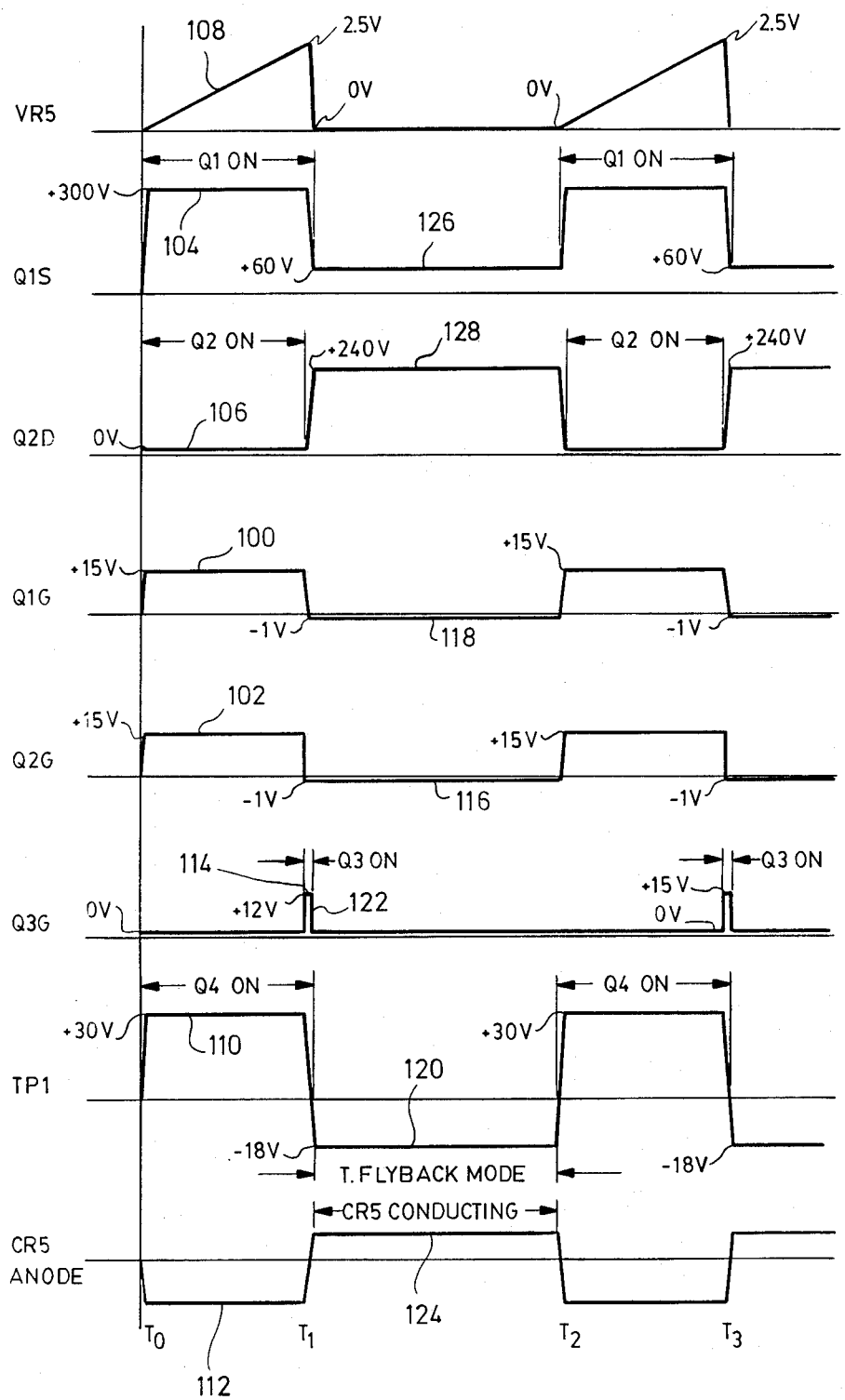
FIG. 3 illustrates a waveform diagram of the circuit diagram illustrated in FIG. 2.

FIG. 3 depicts a waveform diagram demonstrating the operation of the double-switched flyback power converter 20. Waveform $V_{R5}$ refers to the voltage across resistor R5. Waveform $Q_{1S}$ depicts the voltage at the source of $Q_1$ with respect to ground, etc.

Starting with the double-switched flyback power converter 20 in the primary conduction cycle, the zener diode CR1 limits the gate-to-source voltage of the transistor Q1 to approximately 15 V as depicted by interval 100. The source of transistor Q1 is a small voltage drop below the 300 VDC level determined by the ON resistance of transistor Q1 and is depicted by interval 104.

The zener diode CR2 limits the gate to source voltage of the transistor Q2 to approximately 15 V and is depicted by interval 102. The drain of transistor Q2, depicted by interval 106, is a little above the ground level depending on the voltage drop across resistor R5 and the ON resistance of transistor Q2.

The potential difference of approximately 300 V maintained across the primary winding 46 causes the current to ramp nearly linearly through the primary winding of the power transformer 30. The primary current increases through the resistor R5, generating the voltage $V_{R5}$ depicted by interval 108.

A test point TP1 connects to the first end of the second secondary winding 50. The amplitude of the voltage at TP1, as depicted by interval 110, is about 30 V and is a function of the turns ratio between the second secondary winding 50 and the primary winding 46. Referring again to FIG. 2, this 30 V is connected to the base of transistor Q4, requiring the resistor R6 to limit the current through the base of transistor Q4.

Referring again to FIG. 3, a negative voltage, as depicted by interval 112, appears across the diode CR5. The diode CR5 is reverse biased, preventing current conducting into the output circuit.

As the voltage $V_{R5}$ attains the value of the reference voltage of, for example 2.5 V, the control logic circuit 36 charges the gate of transistor Q3 to approximately +12 V as depicted by interval 114. Transistor Q3 turns off transistor Q2, forcing the double-switched flyback power converter 20 into the flyback cycle. The resulting transformer action discharges the gate of transistor Q2 to approximately 1 V below ground, clamped by the forward biased diode CR2. This action is depicted by line 116. Similarly, the gate of transistor Q1 is discharged to a negative value and clamped to approximately 1 V below ground by the forward biased diode CR1. This action is depicted by interval 118. The voltage at test point TP1 goes negative by approximately 18 V, depicted by interval 120. The transistor Q4 turns off, enabling the control logic to discharge the gate of transistor Q3, depicted by interval 122, soon after the decay of voltage $V_{R5}$. Meanwhile, the primary current attained during the primary conduction cycle is coupled into the secondary windings. The diode CR5 is forward biased to a value of less than 1 V, depicted by interval 124. The voltage across the third secondary winding 52 is transformed onto the primary winding 46 of the transformer. The interval 126 depicts the voltage of the source of transistor Q1. The interval 128 depicts the voltage of the drain of transistor Q2.

Although transformer 30 has three secondary windings, more secondary windings may be added to generate different power outputs of different voltage and current ratings.

The double-switched flyback power supply 20 may be regulated by ways commonly known by those in the art. Typically, the output voltage or output current is compared to a reference value in the output circuit. A discrepancy between the output value and the reference value generates an error signal. The error signal is amplified and summed into the control logic circuit 36. One convenient point of insertion would be the negative input 86 to the voltage comparator 56. If, for example, the output voltage is being regulated, an increase in the output voltage increases the voltage at the input 86 of the comparator 56. The comparator will respond to a lower primary current. Less energy is stored in the transformer; during the flyback cycle less current passes into the power output circuit lowering the output voltage. The output current may be controlled in a similar way.

Although the high voltage switches of the preferred embodiment are enhancement mode MOSFET transistors, other types of semiconductor switching devices may be used, with appropriate circuit modification, without withdrawing from the scope of the invention.

The preferred embodiment described above has a 300 VDC supply and a 150 VDC supply. FIG. 4 depicts an alternative rectifier and filter circuit 24 having a removable jumper. With the jumper in place, the circuit provides 300 V and 150 V and will operate from a 110 VAC supply. With the jumper removed, the circuit requires approximately 220 VAC and provides a single 300 V supply. Referring to FIG. 2, the resistor R4 is the only part of the circuit connected to the 150 V supply. The resistor R4 may be connected to the 300 V supply by increasing the value of the resistor R4 to provide a similar charge current to the gate of transistor Q2. Other supply voltages may be accommodated by changing the turns ratio of the transformer as known by those skilled in the art.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention, such as operating the double-switched converter in the forward conversion mode rather than the flyback conversion mode.

What is claimed is:

1. A flyback power-converter for developing a regulated output of DC power from a source of DC, the power converter comprising:

a power transformer including a primary winding and secondary windings;

a first switch, responsive to a first electrical signal, coupled in series with a first end of the primary winding for periodically coupling the primary winding to the source;

a second switch, responsive to a second electrical signal, coupled in series with a second end of the primary winding, both switches being closed when the source is energizing the transformer;

a controller, responsive to a preselected current level in the primary winding, for opening the second switch to initiate an energy transfer from the primary winding;

a first charge pumping circuit, including a first of the secondary windings, for closing the first switch when the energy transfer is completed;

a second charge pumping circuit, including a second of the secondary windings, for closing the second switch when the energy transfer is completed; and an output circuit, operable in response to the energy transfer and including a third of the secondary windings, for producing an output DC voltage.

2. The flyback power-converter of claim 1, wherein the controller further comprises:

means for sensing the preselected current level in the primary winding;

means for sensing a voltage reversal in the first or the second of the secondary windings;

a logic circuit, responsive to the current sensing means and the voltage sensing means, for generating a control signal; and a control switch, responsive to the control signal, for closing the second switch via the second electrical signal.

3. The flyback power converter of claim 2 wherein the means for sensing the preselected current level in the primary winding comprises a resistive element.

4. The flyback power-converter according to claim 1 wherein the first switch and the second switch are field effect transistors.

5. The flyback power-converter according to claim 4 wherein the first charge pump circuit further comprises a first capacitor coupled to the gate of the first switch and wherein the second charge pump circuit further comprises a second capacitor coupled to the gate of the second switch.

6. A method of converting a first DC voltage level to a second DC voltage level, comprising the steps of:

a. providing the first DC voltage level to the primary of a flyback transformer;

b. commencing a primary conduction cycle by shutting a pair of switches in series with the primary winding, c. storing energy in the primary winding of the transformer during the primary conduction cycle;

d. sensing the current in the primary winding of the transformer and, at a predetermined current level, opening a first of the pair of switches, commencing a flyback cycle which opens a second of the pair of switches, during which energy is transferred to secondary windings of the transformer;

e. depleting most of the energy in the secondary load winding and the remaining portion of the energy in the secondary windings associated with charge pump circuits, the charge pump circuits having been charged and set ready to shut both of the pair of switches upon transformer flux reversal; and f. when the energy stored in the primary winding is substantially depleted, shutting the switches to commence another primary conduction cycle.

7. A regulated DC power supply comprising:

means for receiving an AC voltage input;

rectifying means for developing a DC voltage from the AC voltage input;

a power transformer having a primary winding and a plurality of secondary windings;

a first switch means and a second switch means, both switch means being coupled in series with the rectifying means and the transformer;

a sensing means for sensing the current in the primary winding of the transformer;

a first control means responsive to the sensing means for opening the first switch means at a predetermined current in the primary winding of the transformer commencing a flyback cycle;

a second control means for opening the second switch means in response to the commencement of the flyback cycle, the first and second switch means being simultaneously shut in response to flux reversal in the primary winding of the transformer; and output means coupled to a second secondary winding for coupling the second secondary winding to a load.

* * * * *